US007568620B2

(12) United States Patent
Delaney et al.

(10) Patent No.: US 7,568,620 B2
(45) Date of Patent: Aug. 4, 2009

(54) IMAGER KIT WITH MICR HEAD FOR HYBRID PRINTER

(75) Inventors: Robert Delaney, Ithaca, NY (US); Jeffrey Koepele, Ithaca, NY (US); Michael Smith, Ithaca, NY (US); Scott Longrod, Lansing, NY (US)

(73) Assignee: ATSI Holdings, Inc., Ithaca, NY (US)

( * ) Notice: Subject to any disclaimer, the term of this patent is extended or adjusted under 35 U.S.C. 154(b) by 559 days.

(21) Appl. No.: 11/160,794

(22) Filed: Jul. 8, 2005

(65) Prior Publication Data

US 2006/0102723 A1 May 18, 2006

Related U.S. Application Data

(60) Provisional application No. 60/628,039, filed on Nov. 15, 2004.

(51) Int. Cl.
*G06K 7/00* (2006.01)

(52) U.S. Cl. .................................... 235/440; 235/486

(58) Field of Classification Search ................. 235/440, 235/449, 380, 382, 383, 375, 486, 487, 493
See application file for complete search history.

(56) References Cited

U.S. PATENT DOCUMENTS

| | | | | |
|---|---|---|---|---|
| 5,808,645 | A * | 9/1998 | Reeves et al. | 347/103 |
| 6,123,260 | A * | 9/2000 | Menzenski | 235/449 |
| 6,126,073 | A * | 10/2000 | Rowlands | 235/449 |
| 7,210,630 | B2 * | 5/2007 | Nagata et al. | 235/454 |

* cited by examiner

*Primary Examiner*—Thien M Le
(74) *Attorney, Agent, or Firm*—George R. McGuire; Bond Schoeneck & King, PLLC

(57) ABSTRACT

The present invention contemplates a hybrid printer having printing capabilities at its back end and imagining capabilities at its front end. A conventional receipt printer with a MICR read head has been modified by replacing its front cover with a cover having the same platform but that incorporates a pair of opposed imagers, a second MICR read head, a diverter, and rollers for moving media therethrough.

11 Claims, 16 Drawing Sheets

IMAGER KIT WITH MICR HEAD FOR HYBRID PRINTER

CROSS REFERENCE TO RELATED APPLICATION

This application claims priority to Applicant's U.S. Provisional Application Ser. No. 60/628,039, filed Nov. 15, 2004.

BACKGROUND OF THE INVENTION

The present invention generally relates to hybrid printers, such as printers that print text on media, such as a receipt, and also scan an image of media, such as a check. Check processing is fast progressing from methods that require transportation from the place of payment to the account holder's mailbox, including numerous intermediate physical handlings. The driving force is cost, since it is much less expensive to send electronic data than it is to move physical items. This transition has been on-going for several years and the latest inducement is in the Check 21 Act, which gives legal status to recreating a check from image data if paper is still required at any point to complete the journey.

Transitioning to processing in digital form is based on acquisition of electronic equipment for this, and because this is a costly change and requires significant logistical and training support, it is occurring over a period of time, even within small stores and bank branches.

A consideration in planning for document digitization is where that digitization should be done; and if that target is at the point of first presentment of (financial) documents whether to replace devices with new ones that already have the needed features or with devices that can be upgraded at the actual start-of-use time with the needed features.

There already exists in the point-of-sale (POS) industry printers that have built-in MICR read heads as well as an additional print station to print on "slip" (including checks) media and on "receipt" media. These hybrid printers have been recently redesigned to include a scanning element that can digitize check sized documents. These have provided for one-sided scanning, thus restricting usage to financial payment Electronic Check Conversion, which only needs an image for dispute resolution purposes. Newer peripherals, largely targeting the banking industry, have provided for dual sided imaging as required by the Check 21 Act for recreation of a legal document at points distant from the original check paper. This contingent of devices was designed from the basic concepts of relatively high volume check sorting transports by dropping many of the transport features, including document speed and sorting. However, that approach still leaves a rather expensive checks-only device, and some of these models also have limited slip printing capabilities.

In addition to expense, there is the question of footprint—the more it is like a document transport, the more room is needed. But the human factors need is to fit at "points of first presentment", where the document volume is low but also varied. Thus the ideal device must be inexpensive, have a paper traversing path that minimizes footprint, and be able to image a variety of documents.

The problem of being able to handle a variety of documents has so far been solved by building separate devices, geared to handle limited ranges of thickness and size and thus not being very cost-effective in their target market.

If a device is to be designed for upgrade in the field, then simplicity of upgrade task also becomes an issue, in order to minimize technician work time as well as the disruption to normal usage activities. If the upgrade is too complex, then the savings from delaying purchase until the time the rest of the upgraded processing system is in place would be lost.

Thus what has been lacking is the innovation to overcome these problems—a device that fits, at reasonable cost, and can handle the document types that need to be captured at the point of presentment.

In addition to these major physical concerns is one of multiple transitions over the equipment lifetime of system processing by using the device features in different sequences, depending on the system capabilities of the moment and the type of document being handled. For instance, the relationship between which side of a check requires printing and which side is inserted for MICR reading may need to be changed. Such changes may require the use of an automatic check flipper or manual flipping, increasing the clerk time spent on handling transaction. Thus novel device flexibility is needed to match evolving system processing.

It is an object of the present inventions to reveal a design for a hybrid printer that overcomes the above mentioned concerns.

It is another object of the present inventions to build a single device that is applicable to both the POS markets and the financial counter market.

SUMMARY OF THE INVENTION

In accordance with the foregoing objects and advantages, the present invention provides a hybrid printer having printing capabilities at its back end and imaging capabilities at its front end. A conventional receipt printer with a MICR read head has been modified by replacing its front cover with a cover having the same planform but that incorporates a pair of opposed imagers, a second MICR read head, and rollers for moving media therethrough. A printed circuit board embedded with the firmware needed to operate the imagers is plugged into the existing control board of the printer and is hard wired to the instructional hardware driving the imagers and MICR read head. Various combination of connector options can be included on the upgraded board and control board, such as RS232, USB, or Ethernet. Thus, the retrofitting of an exiting receipt printer with an imaging module reduces the costs associated with adding the imaging functionality for entities that have already made an investment in the base receipt printer.

The imager cover includes a media introduction point formed in its front surface, in addition to maintaining the traditional bottom and side/top media introduction points. The front introduction point accommodates media of varying thickness and rigidity, and passes the media presented therethrough directly past the imagers and second MICR read head. Media such as paper checks, plastic cards, credit card slips, and the like may be presented to the unit through this front presentment point. Due to the relatively straight path this presentment point follows, more rigid media, such as the plastic cards, can be effectively processed, as opposed to the curved path the media follows when presented through either the bottom or side/top presentment points.

The top of the cover includes a pair of opposed imagers mounted in vertically spaced relation to one another and separated by a predetermined distance that is sufficient to accommodate media of varying thicknesses therebetween but that is not so great as to lose image quality of any media having an acceptable thickness. Two sets of vertically opposed rollers are positioned laterally adjacent to the outer edges of the two imagers for purposes of frictionally engaging the media and moving it through the imagers. A pair of media sensors are positioned adjacent the outer edges of the roller sets to sense the leading and trailing edges of the media as it passes through the imaging module, and communicate this positional information to the motors driving the rollers, thus ensuring the media will fully pass through the imager module at a desired rate of speed.

The imager module is equipped with a MICR read head that is positioned on the opposite side of the media path as the MICR read head present in the base printer, thus providing the retrofit printer with the ability to read MICR code present on either side of the media.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1A:
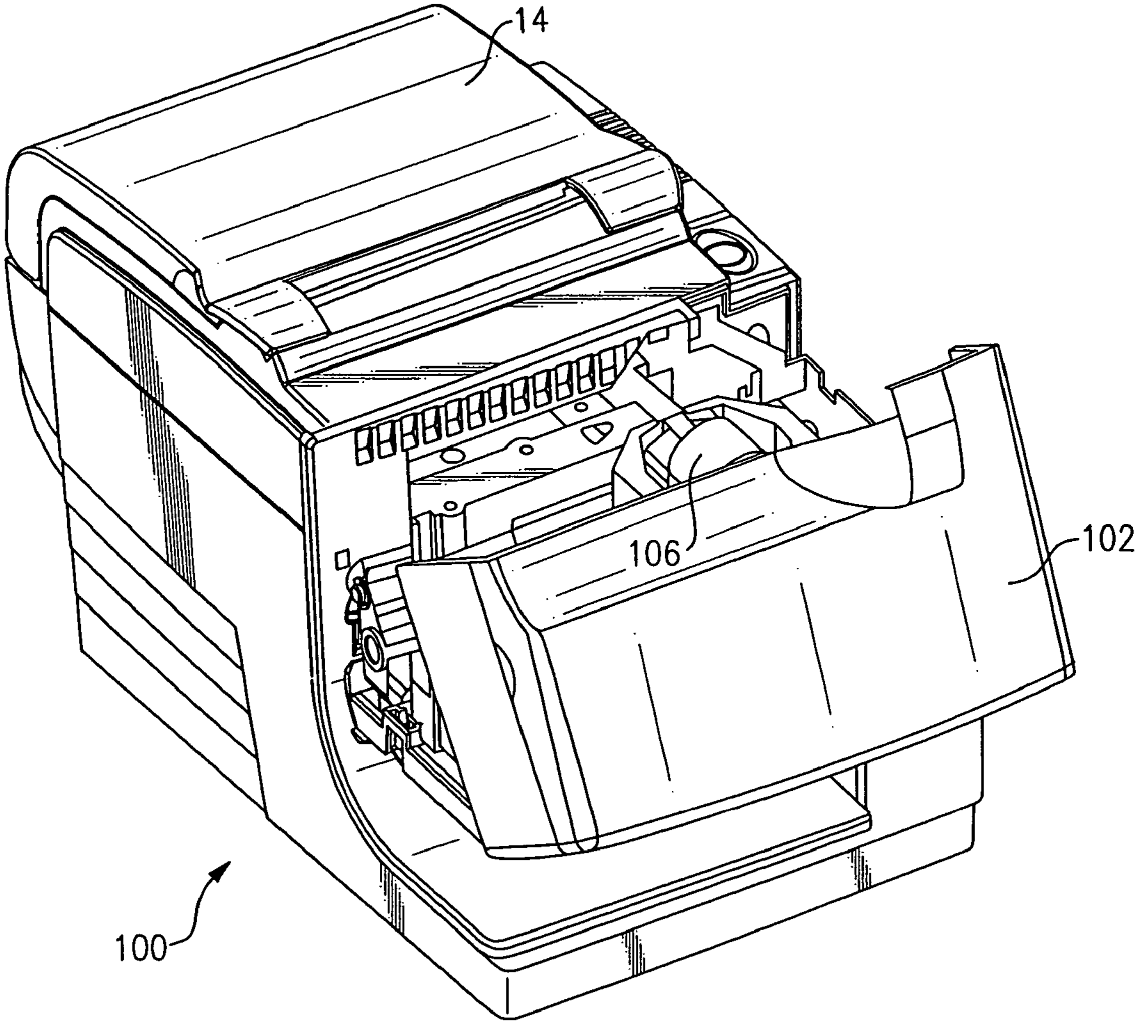
FIG.1A Prior Art
FIGS. 1A-1D are perspective views of a prior art hybrid transaction printer.
Figure 1B:
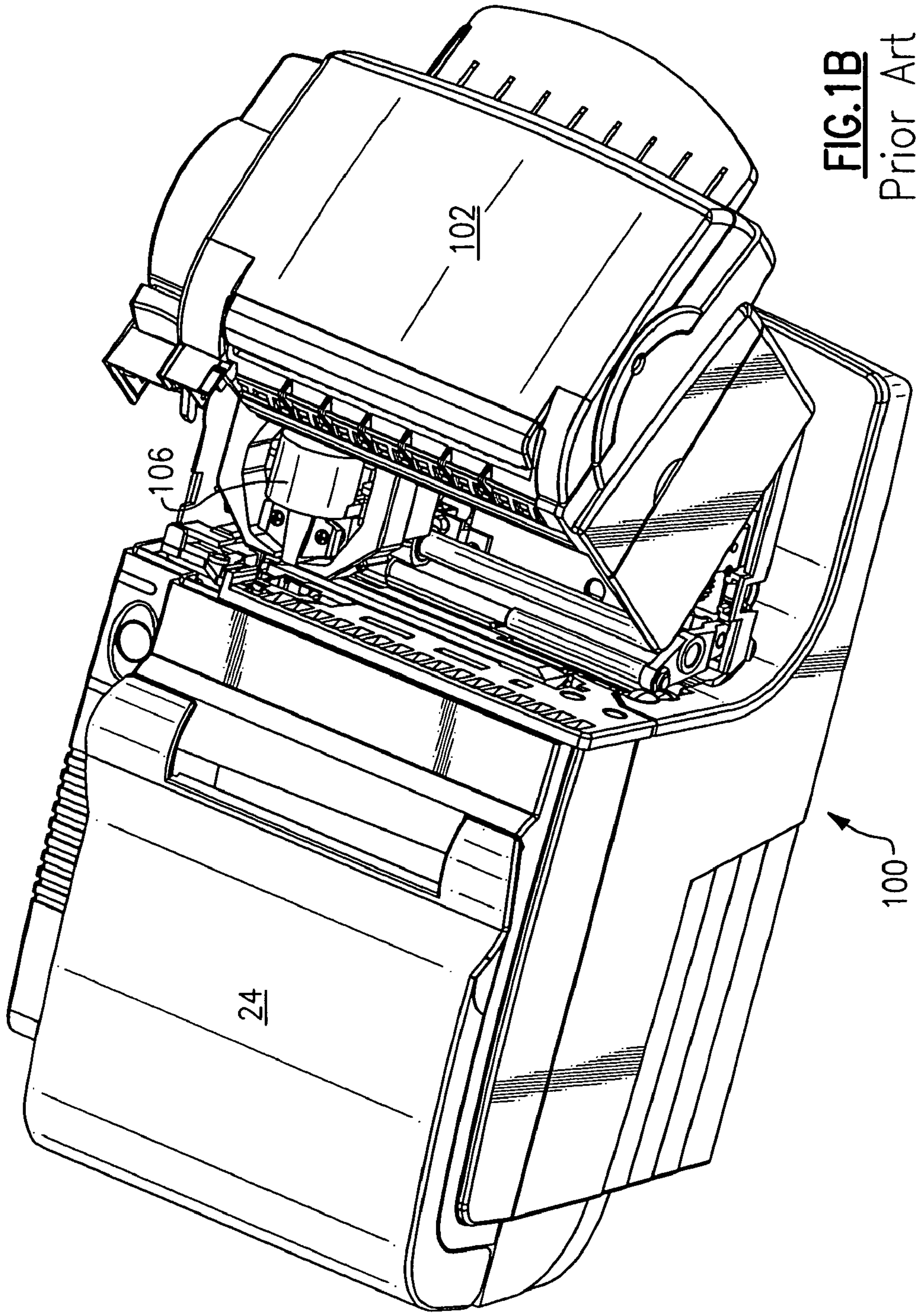
FIG.1B Prior Art
Figure 1C:
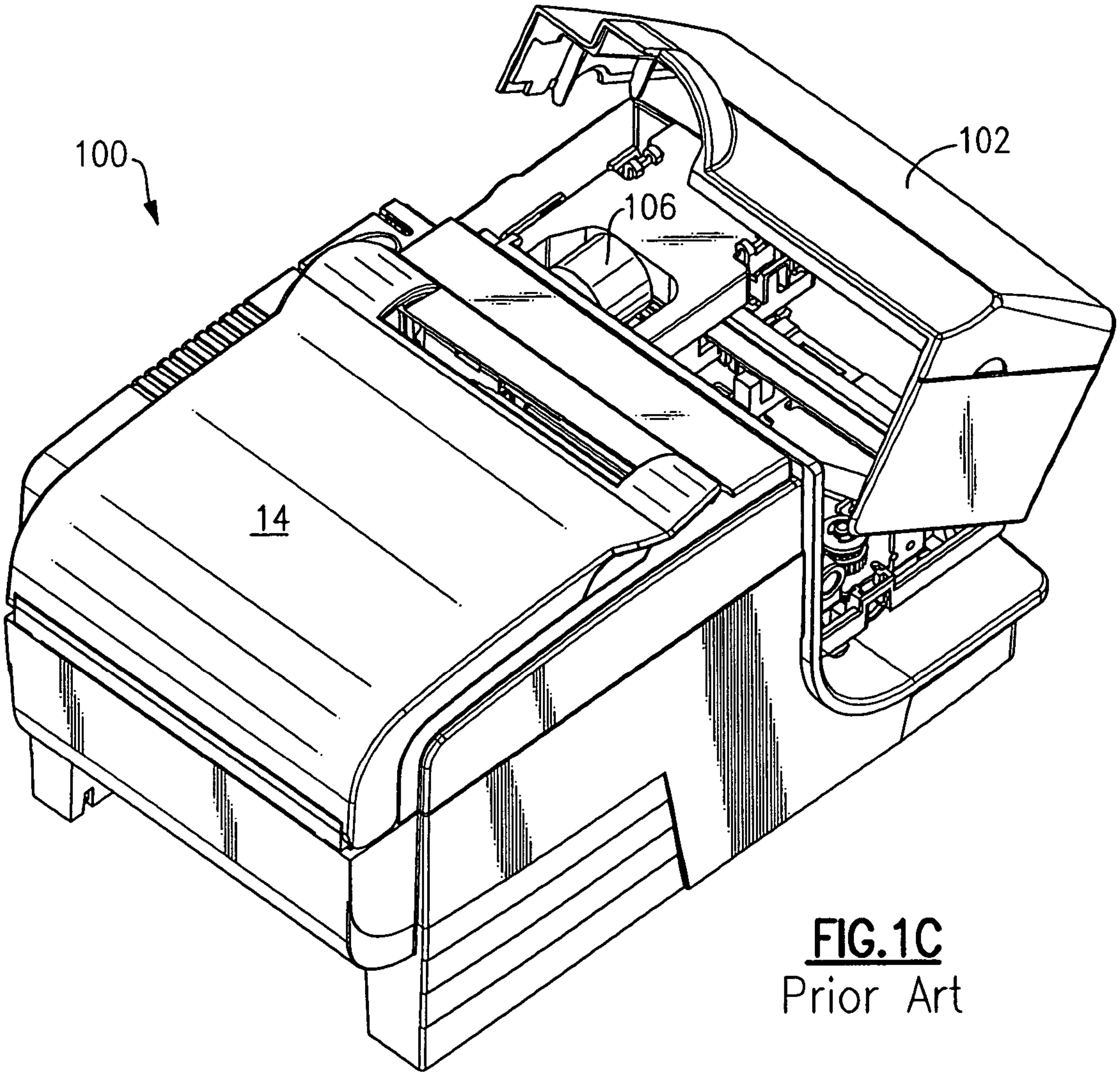
FIG.1C Prior Art
Figure 1D:
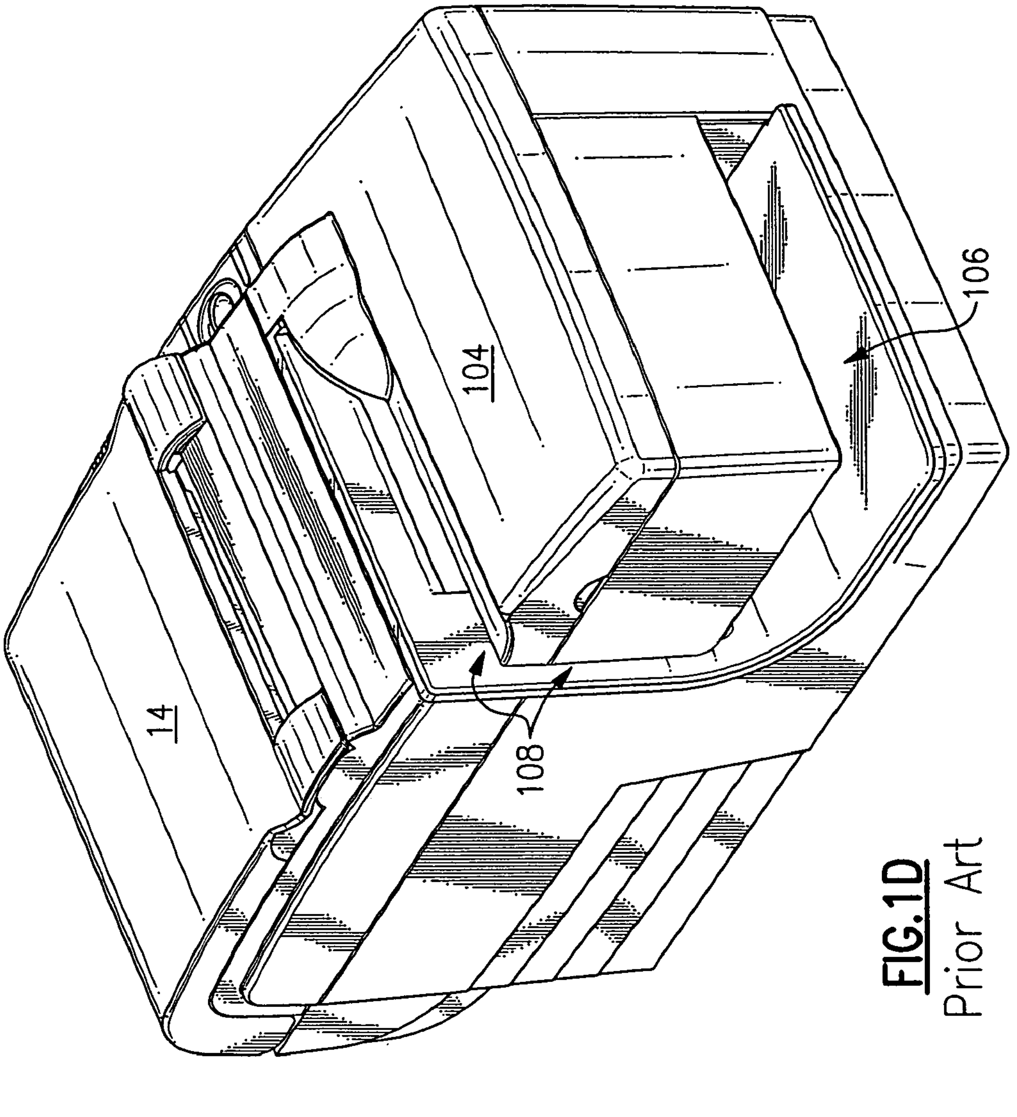
FIG.1D Prior Art
Figure 2A:
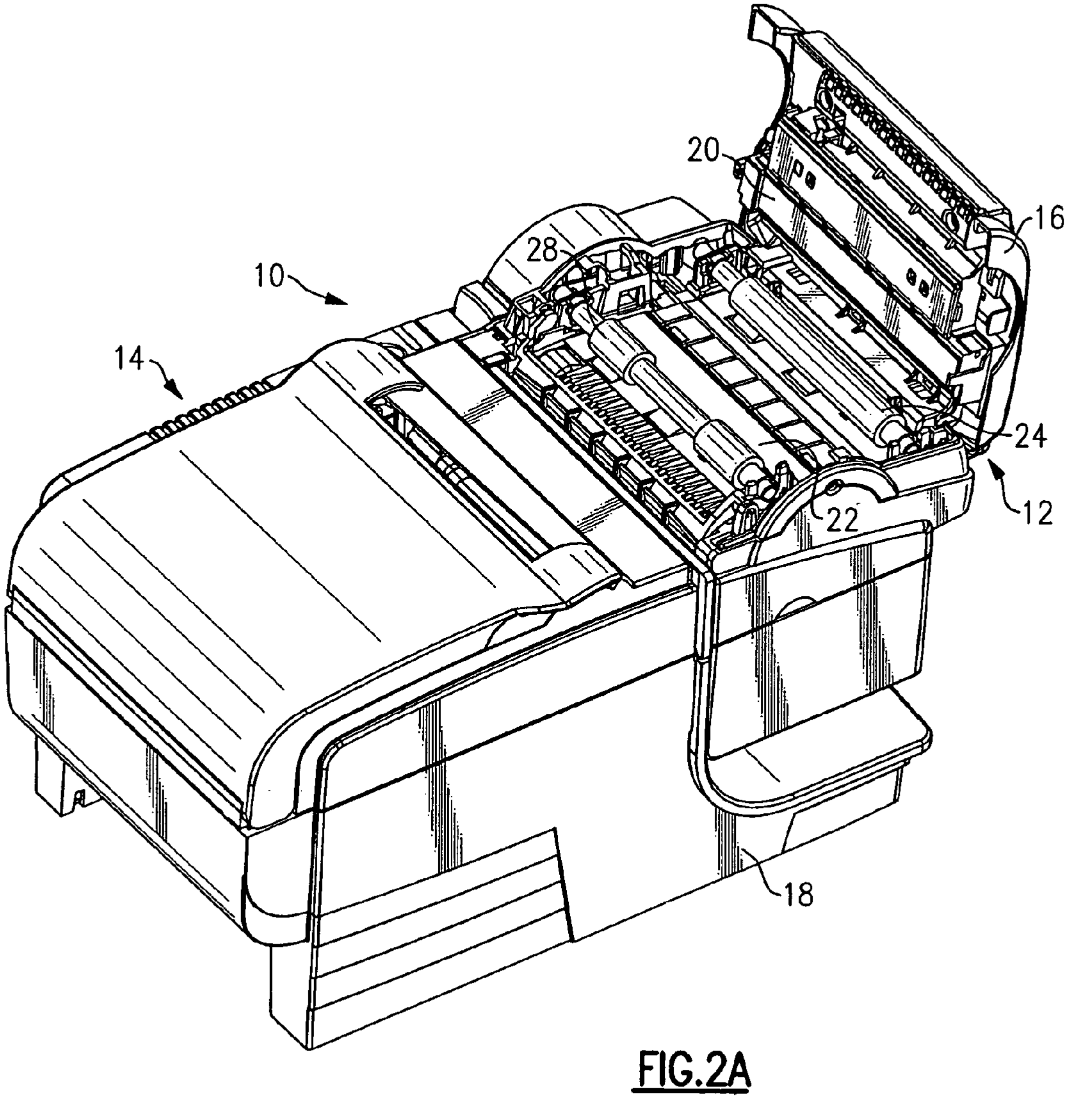
FIGS. 2A and 2B are both perspective views of the present invention taken along different orthogonal angles and with the scanner module cover open.
Figure 2B:
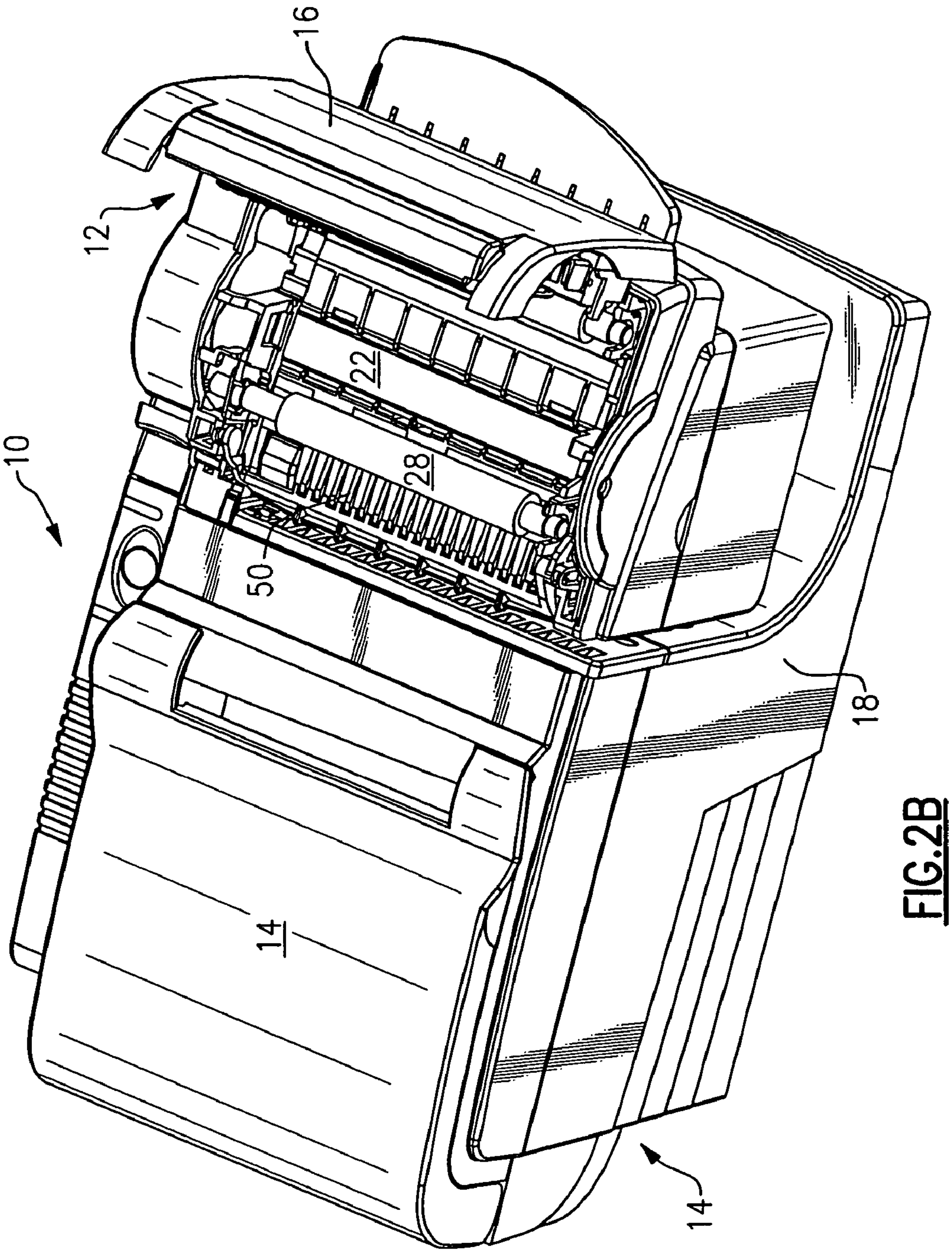
Figure 3:
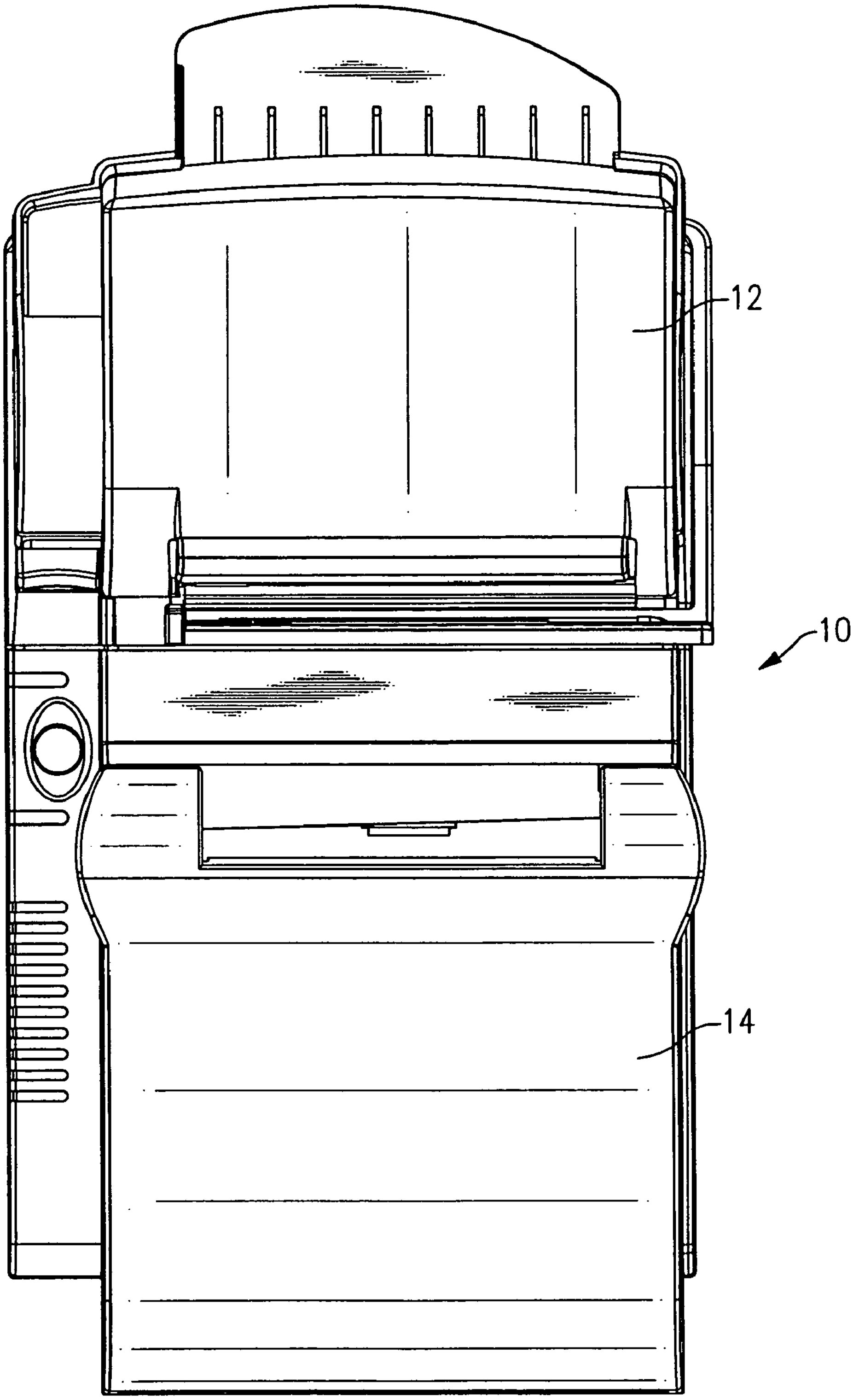
FIG. 3 is a top plan view thereof.
Figure 4:
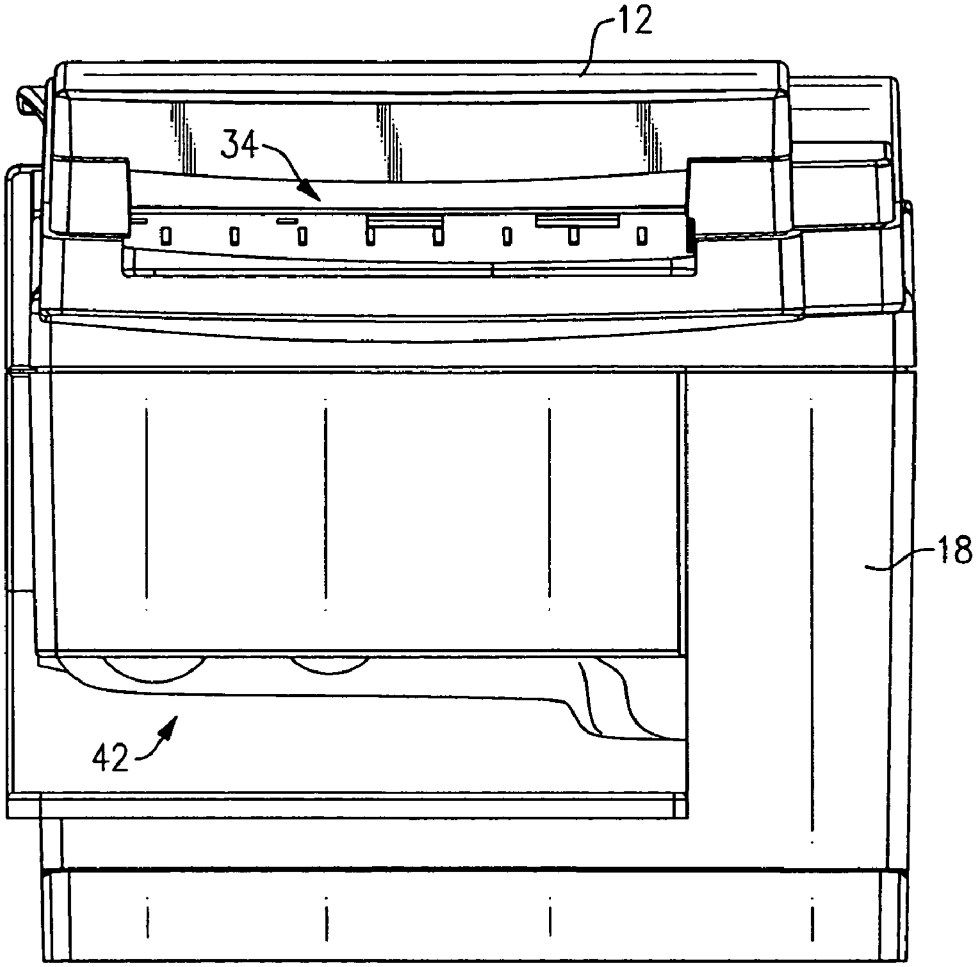
FIG. 4 is a front elevation view thereof.
Figure 5A:
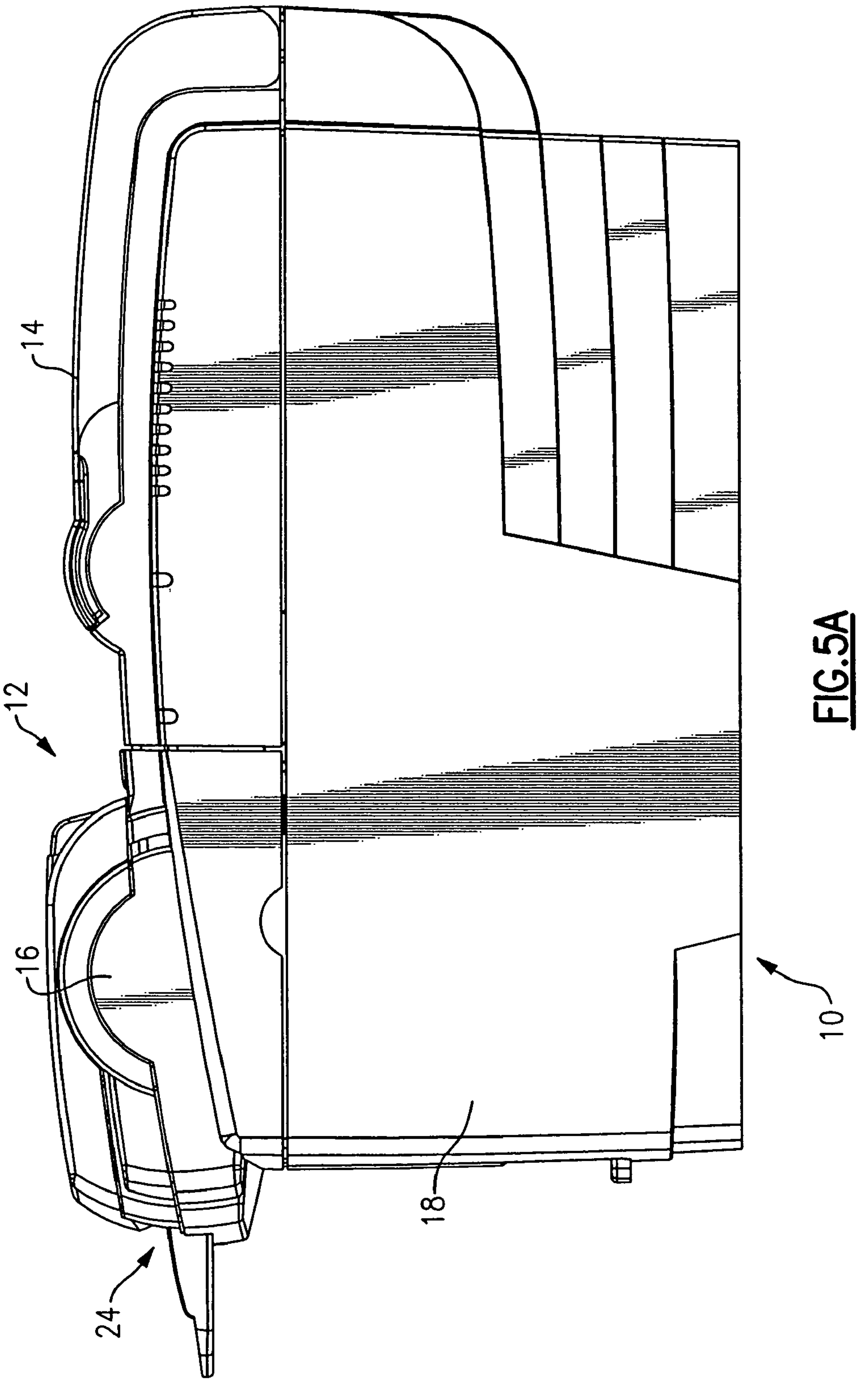
FIGS. 5A and 5B are opposite side elevation views thereof.
Figure 5B:
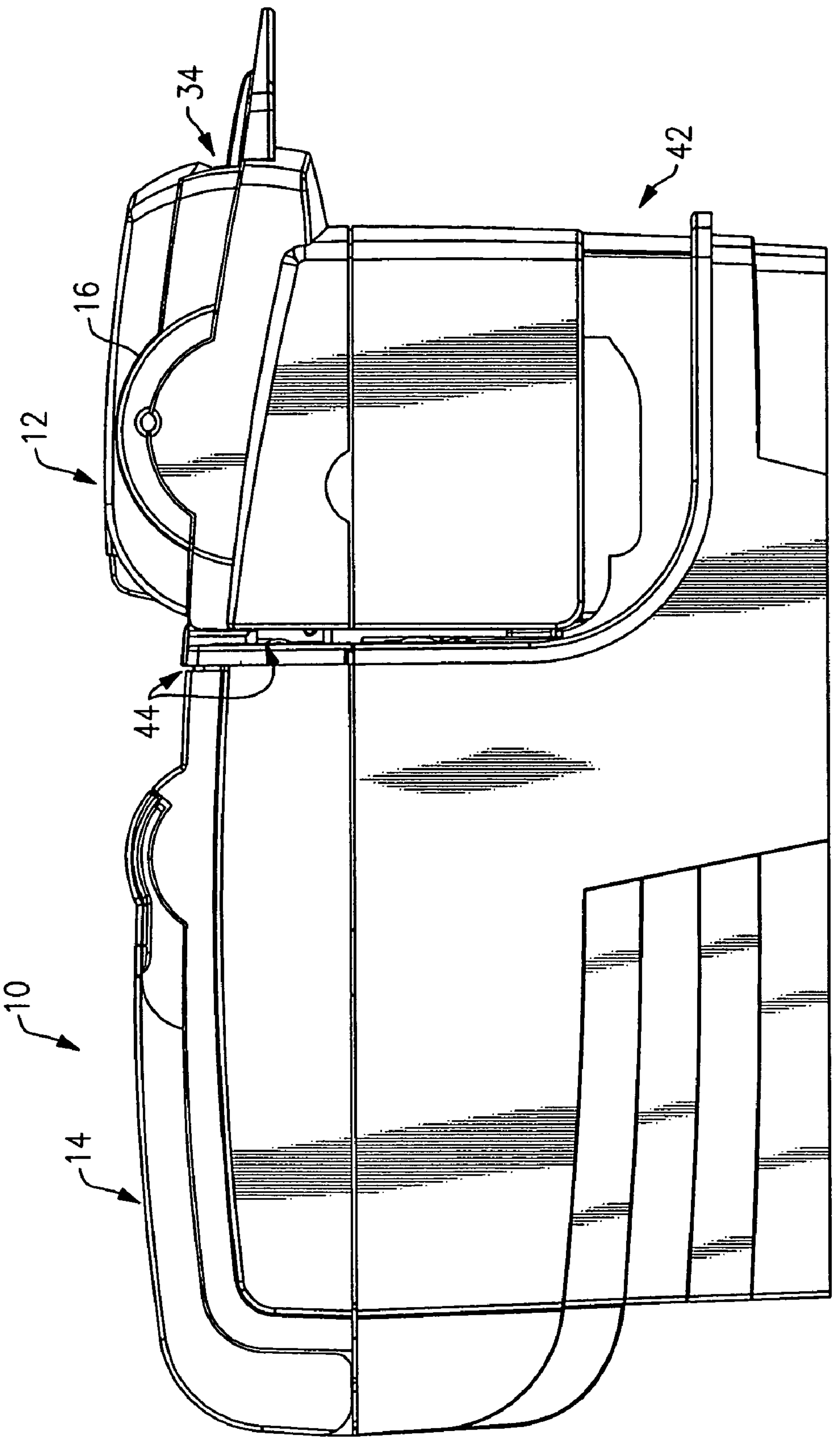

Referring now to the drawings, wherein like reference numerals refer to like parts throughout, there is seen in FIGS. 2-8 a hybrid printer, designated generally by reference numeral 10, generally comprising an imaging module 12 positioned at the printer's front end, and a receipt printer portion 14 positioned at the printer's rear end. Imaging module 12 is adapted to scan media, such as a check, and produce a digital image thereof that can be stored in memory and electronically transmitted for further processing or storage. Printer portion 14 is conventional in the transaction printer industry and is adapted to print text, graphics, or combinations of the two on media, such as receipt paper. Printer portion 14 is identical to the printer portion of the model number A776 hybrid printer manufactured by TPG, Inc. of Ithaca, N.Y.

Figure 6A:
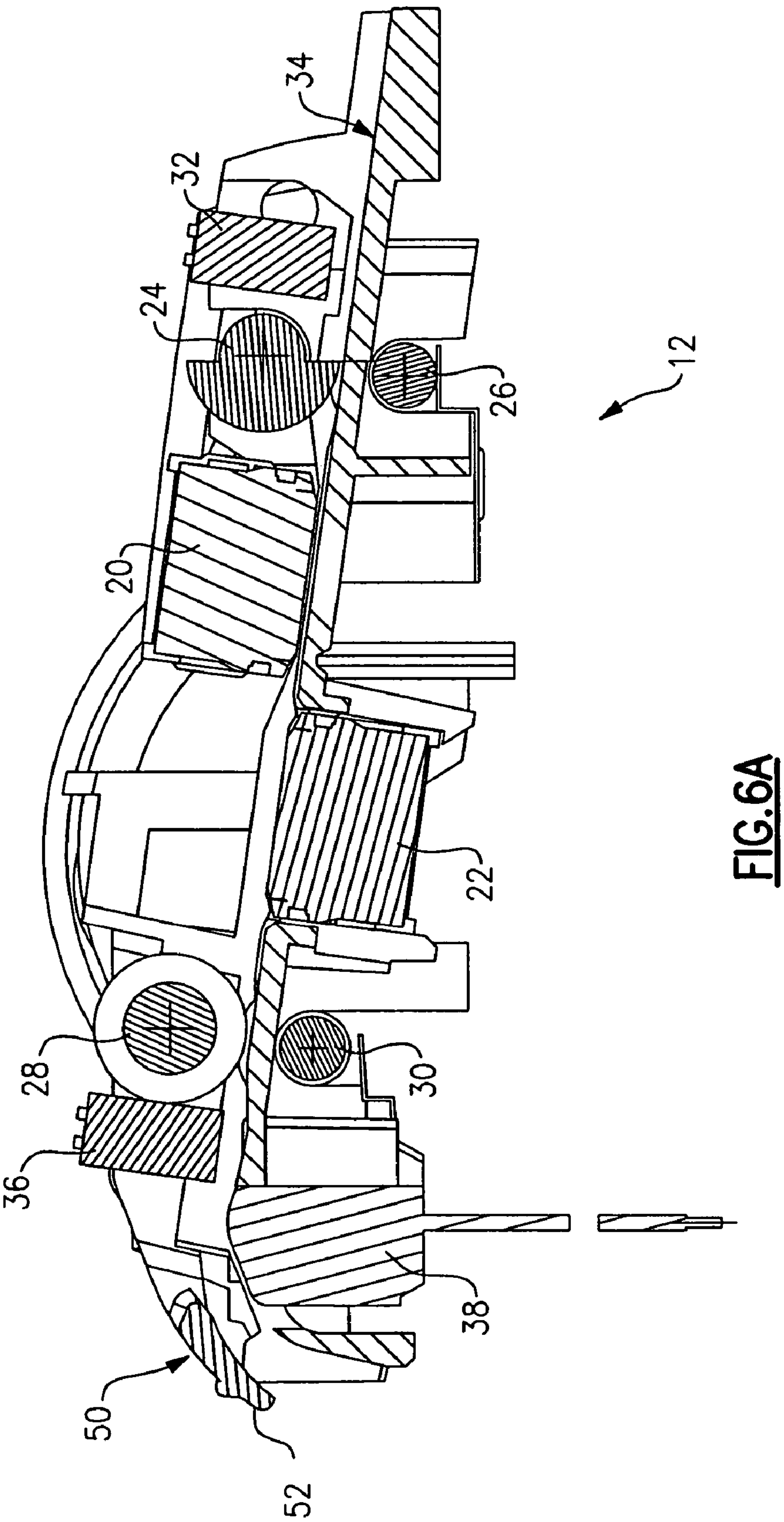
FIG. 6A-6C are cross-sectional side elevation views of the imaging module.
Figure 6B:
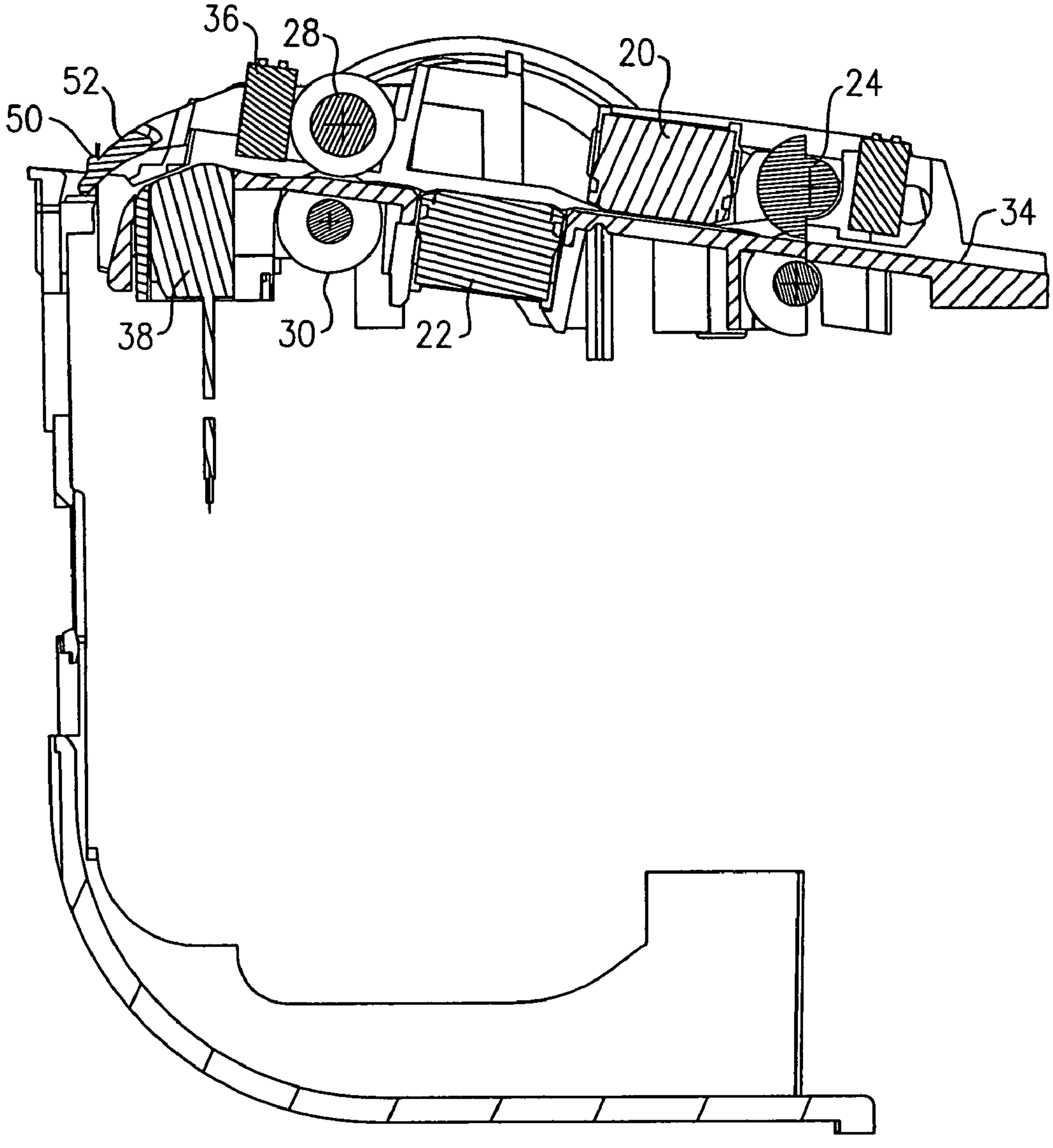
Figure 6C:
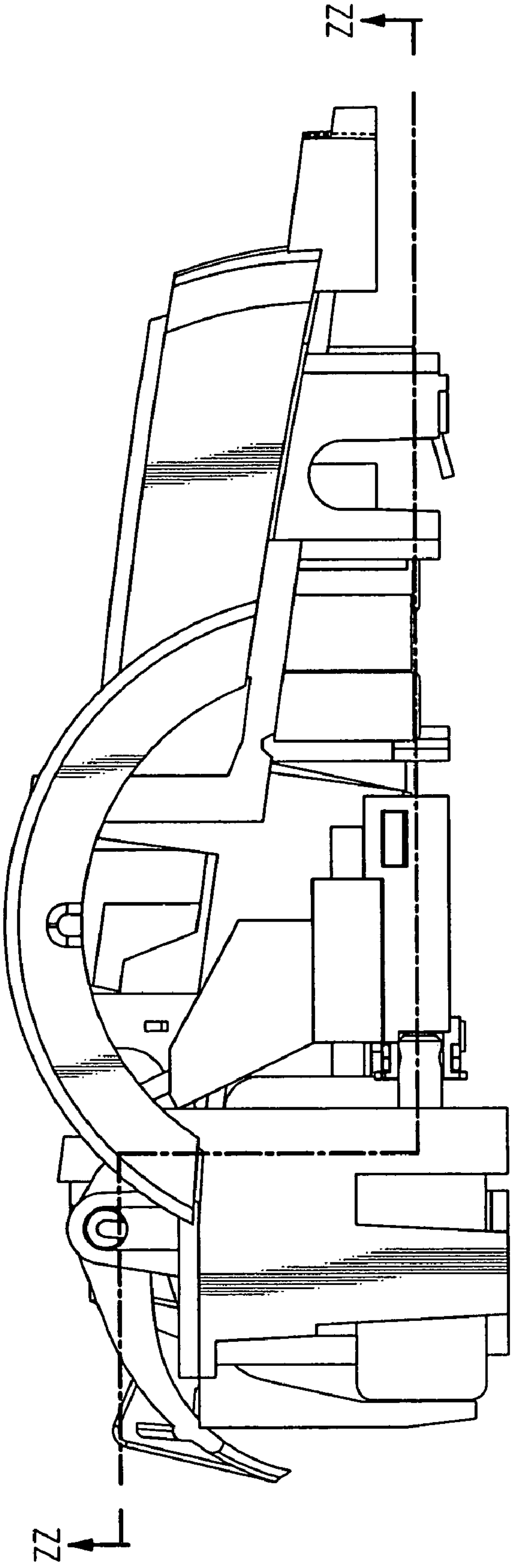
Figure 6D:
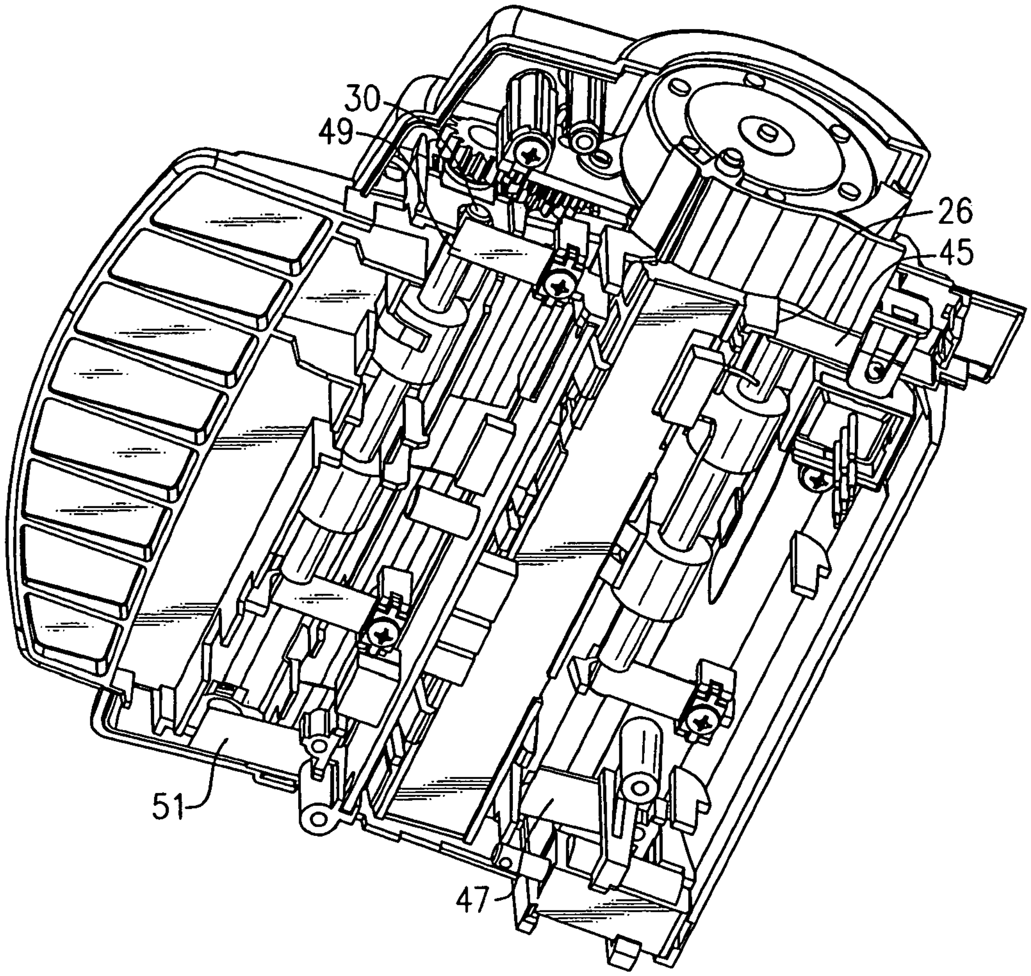
FIG. 6D is a bottom perspective view of the imaging module.
Figure 7:
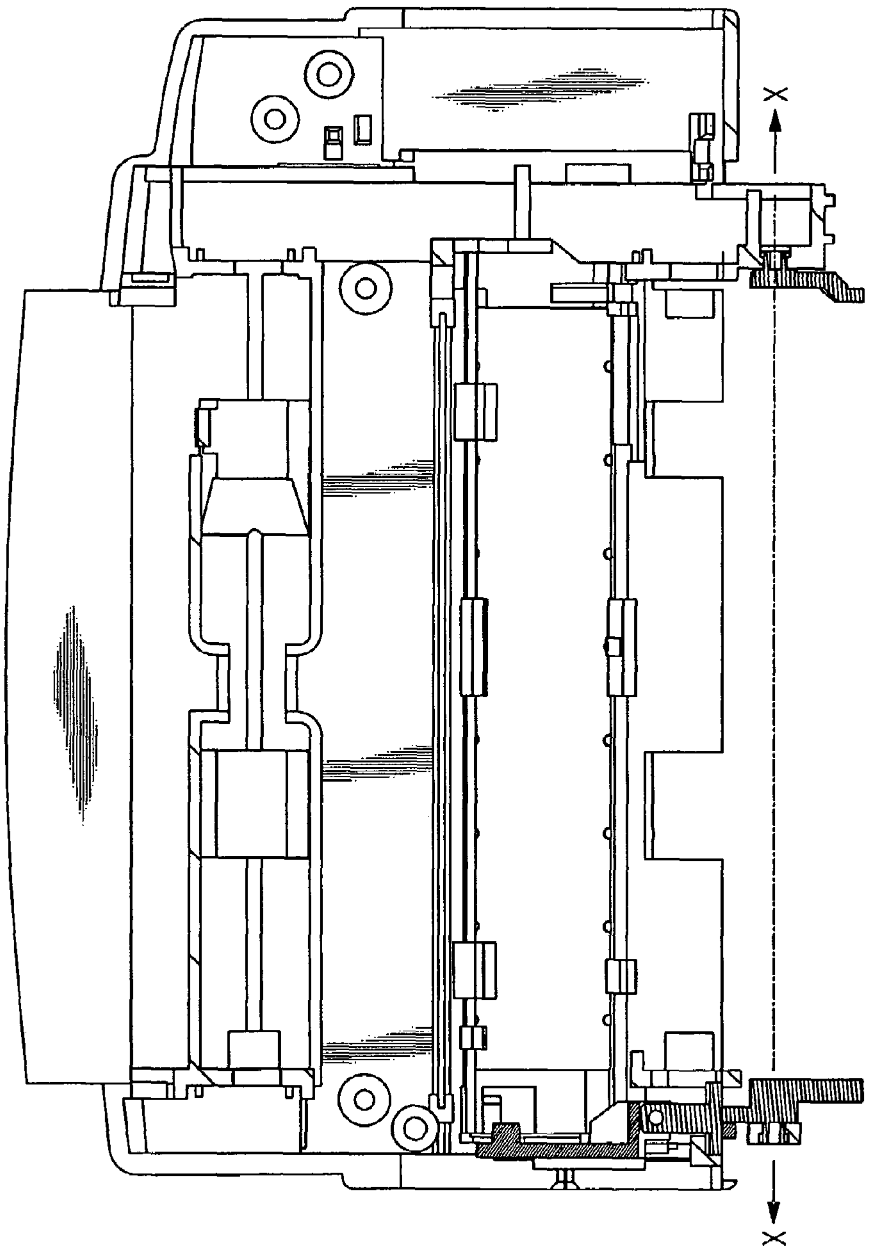
FIG. 7 is a sectional view taken along section line ZZ-ZZ of FIG. 6C.

With specific reference to FIGS. 6A-6C, as well as generally to FIGS. 2-5 and 8, imaging module 12 comprises a cover assembly 16 hingedly interconnected to the body 18 of printer 10. Assembly 16 serves as housing for an upper imager 20 for digitally scanning the upwardly facing surface of media passing through module 12, a lower imager 22 for digitally scanning the downwardly facing surface of the media and that is positioned in laterally and vertically spaced relation to upper imager 20 when assembly 16 is closed relative to body 18, a pair of vertically opposed media feed rollers 24, 26 positioned adjacent the outwardly facing edge of imager 20, a pair of vertically opposed media feed rollers 28, 30 positioned adjacent the outwardly facing edge of imager 22, a media senor 32 positioned outwardly adjacent vertically aligned roller pairs 24, 26 at the inlet of the front slip path 34, and a media sensor 36 positioned outwardly adjacent vertically adjacent roller pairs 28, 30 adjacent the exit of slip path 34. Also included in module 12 is a conventional MICR readers 38, while integrated printer MICR reader 40 is positioned on opposing sides of slip path 34 for purposes of reading the opposing side of a slip passing through these paths. In addition, a printer head 43, such as an impact print head, is positioned in the side/top and bottom slip paths, adjacent MICR reader 41, in order to print a predetermined item on the media, such as a limited endorsement on the back of a check. Sensors 32 and 36 electrically sense the presence of the leading and trailing edges of media, sending electrical signals to the motors driving rollers 24 and 28, such that the rollers move the media past the imagers 20 and 22, and MICR readers 38 and 40, and out of the slip path through which it is traveling. For instance, sensor 32 senses the presence of media when it is inserted in slip path 34 and sends an electrical signal to the motors driving rollers 24 and 28, thereby actuating the motors for a predetermined period of time and causing the opposed roller sets to grasp and advance the media past imagers 20 and 22 and MICR readers 38 and 40. Sensor 36 senses the presence of the media and, more importantly, the lack of media, thus determining when the media has full passed imagers 20 and 22. Thus, sensor 36 sends an electrical signal to the motors driving rollers 24 and 28 that will result in the motors turning off, thereby stopping the rollers after a predetermined period of time after the signal has been sent.

Imaging module 12 includes standard bottom entrance and side/top entrance slip paths 42, 44, respectively, and further includes front entrance slip path 34. Slip paths 42 and 44 each require the media to travel through a curved path in order to be fully imaged and MICR scanned, but front load slip path 34 provides an essentially straight travel path for the media. Due to this relatively straight path, media that is more rigid than paper, such as plastic cards, can be processed through this path. Furthermore, because the relative thickness of more rigid media is generally greater than the traditional paper media, slip path 34 is of a dimension that accepts a range of media thicknesses without compromising the quality of the image captured by imagers 20 and 22.

To ensure that media with a variable thickness range, and in particular a thickness range that includes media that is greater than the typical paper media processed by a conventional printer, cantilevered springs 45 and 47 are mounted at opposing ends of, and positioned vertically below, thereby exerting an upward bias force on roller 26, and cantilevered springs 49 and 51 are mounted at opposing ends of, and positioned vertically below, thereby exerting an upward bias force on roller 30. Springs 45, 47, 49, and 51 collectively permit rollers 26 and 30 to flex a sufficient amount to maintain frictionally engaged relation to media passing thereover. In addition, the spring constant associated with springs 45, 47, 49, and 51 is sufficiently low, preferably about 4 pounds/inch, to prevent over-stressing the motor driving rollers 24 and 28.

In order to ensure that media passing through the side/top or bottom load slip paths do pass by imagers 20 and 22, a deflector assembly 50 is provided. Deflector assembly 50 includes a curved media deflector body 52 that is mounted to the body of printer 10 for pivotal movement about an axis X-X that extends transverse to the longitudinal axis of the printer. Media that passes through the top/side and bottom load slip paths are directed by curved body 52 into the slip path 34 that will cause the media to become engaged by roller pairs 24, 26 and 28, 30, and pass by imagers 20 and 22, and MICR readers 38, 40.

Figure 9:
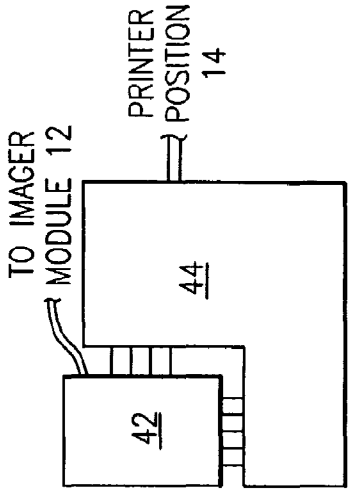
FIG. 9 is a schematic representation of the printed circuit board structure associated with the present invention.
Figure 8:
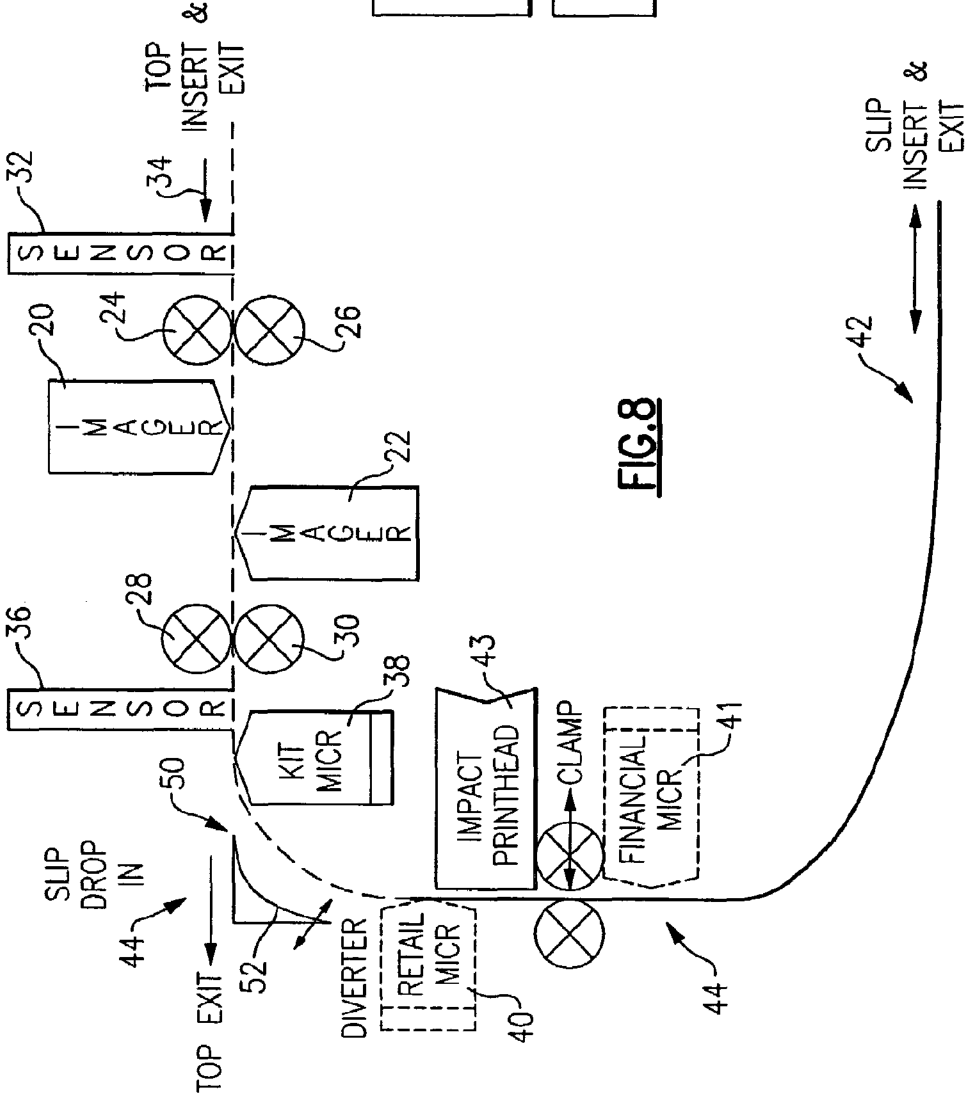
FIG. 8 is a schematic representation of the imaging module.

With reference to FIG. 9, the firmware and circuitry associated with imaging module 12 is preferably contained on its own printed circuit board 42, although it is possible to accommodate the firmware necessary to operate imaging module on the same PCB that contains the firmware and circuitry for driving receipt portion 14. In order to make efficient use of the space available in the housing for printer 10, interconnecting PCB 42 to the printed circuit board 44 containing the printer's control circuitry via a conventional interconnect module in a mezzanine arrangement is preferred. To enhance the types of connectors printer 10 is adapted to receive, PCBs 42 and 44 can contain any combination of RS232, Ethernet, and USB connectors.

Imaging module 12 can be originally provided with printer 10, or it may be retrofit into pre-existing printers that contain less functionality than that offered by module 12. For instance, the hybrid printer model number A776 manufactured and sold by TPG, Inc. of Ithaca, N.Y., illustrated in FIGS. 1A-1D, identified by reference numeral 100 is identical to printer 10 except that its front cover 102 does not contain any imaging capabilities, nor a front loading slip path (and consequently does not have an imaging PCB since it does not perform imaging.) Instead, printer 100 contains the same printer portion 14 as contemplated by printer 10, a cover 104 for a slip processing portion having a MICR reader 106 positioned adjacent the exit of the slip path. Imaging media may be processed through one of two available slip paths; either a bottom loading path 106 or a top/side path 108. In this invention, printer 10 adds the front loading slip path 34 which permits processing of more rigid imaging media due to its relatively straight travel path versus the curved paths through which the media must travel in order to be processed through printer 100.

To retrofit imaging module 12 to printer 100, module 12/cover assembly 16 is simply substituted for cover 102, PCB 42 is connected to PCB 44, and cabling electrically interconnects imaging module 12 to PCB 42. Because cover assembly 16 is virtually identical in scale to cover 102 and in the manner it hingedly connects to the body of printer 10/100, no other structural modification is necessary to complete the retrofit. Ribbon cable or other common data transfer cabling is then extended between module 12 and PCB 42 to provide the necessary instruction to imagers 20, 22 and other associated hardware in module 12 in a manner that is readily apparent to one skilled in the art.

What is claimed is:

1. A hybrid printer for processing imaging media, comprising:
- a printer body defining a first slip path that extends along a single plane over its entire length and a second slip path extending at least partially in a curved pathway;
- a cover hingedly interconnected to said printer body;
- a first imager interconnected to said cover and adapted to create a digital image file of a first side of the imaging media when the imaging media is positioned in said first slip path; and
- a diverter positioned in proximity to said second slip path and movable between first and second positions to direct imaging media between said first and second slip paths.

2. The hybrid printer of claim 1, further comprising a second imager positioned laterally and in vertically spaced relation to said first imager and interconnected to said cover and adapted to create a digital image of the second side of the imaging media.

3. The hybrid printer of claim 1 further comprising a first MICR reader interconnected to said cover and adapted to read MICR encoding printed on the first side of the imaging media.

4. The hybrid printer of claim 3 further comprising a second MJCR reader interconnected to said printer body and adapted to read MICR encoding printed on the second side of the imaging media.

5. A hybrid printer having an imaging module for processing imaging media, comprising:
- a first imaging media path insertion point from which the imaging media is initially advanced for processing through the imaging module and a first imaging media path in communication with said first imaging media path insertion point, wherein said first imaging media path extends along a single plane over its entire length;
- a second imaging media path insertion point from which the imaging media is initially advanced for processing through the imagining module through a curved path;
- a third imaging media path insertion point from which from which the imaging media is initially advanced for processing through the said hybrid printer through said curved patch;
- a diverter positioned in proximity to said first imaging media path insertion point and movable between first and second positions which direct the imaging media between said first and second media path insertion points, respectively.

6. The hybrid printer of claim 5, wherein each of the entry points also serves as an imaging media exit point.

7. The hybrid printer of claim 5, further comprising of at least first, second, and third imaging media detection sensors positioned in proximity to said first, second, and third media path insertion points, respectively.

8. An imaging module for imaging media adapted to be retrofit in place of a printer cover to a printer comprising:
- a first imaging media path insertion point from which the imaging media is initially advanced for processing through the imaging module, and a first imaging media path in communication with said first imaging media path insertion point, wherein said first imaging media path extends along a single plane over its entire length; and
- a diverter positioned in proximity to said first imaging media path insertion point and movable between first and second positions which direct the imaging media towards first and second media exits, respectively.

9. The imaging module of claim 8 further comprising a cover movable between open and closed positions, wherein when said cover in said open position access to first imaging media path is provided.

10. The imaging module of claim 8 further comprising
- a second imaging media path insertion point from which the imaging media is initially advanced for processing through the imagining module; and
- a third imaging media path insertion point from which from which the imaging media is initially advanced for processing through the said hybrid printer.

11. The imaging module of claim 10, further comprising at least first, second, and third imaging media detection sensors positioned in proximity to said first, second, and third media path insertion points, respectively.

* * * * *

UNITED STATES PATENT AND TRADEMARK OFFICE
CERTIFICATE OF CORRECTION

PATENT NO. : 7,568,620 B2
APPLICATION NO. : 11/160794
DATED : August 4, 2009
INVENTOR(S) : Robert Delaney et al.

It is certified that error appears in the above-identified patent and that said Letters Patent is hereby corrected as shown below:

Column 6, Claim 4, line 5, please delete "MJCR" and insert --MICR--

Column 6, Claim 5, line 20, please delete first occurrence of "from which"

Column 6, Claim 10, line 54, please delete "imagining" and insert --imaging--

Column 6, Claim 10, line 55, please delete first occurrence of "from which"

Signed and Sealed this

Fifteenth Day of September, 2009

David J. Kappos
*Director of the United States Patent and Trademark Office*